US009168938B2

(12) United States Patent
Wang

(10) Patent No.: US 9,168,938 B2
(45) Date of Patent: Oct. 27, 2015

(54) FOLDING BALL TROLLEY HAVING MINIMIZED VOLUME

(71) Applicant: Chia-Ling Wang, New Taipei (TW)

(72) Inventor: Chia-Ling Wang, New Taipei (TW)

( * ) Notice: Subject to any disclaimer, the term of this patent is extended or adjusted under 35 U.S.C. 154(b) by 280 days.

(21) Appl. No.: 13/888,453

(22) Filed: May 7, 2013

(65) Prior Publication Data

US 2014/0291969 A1 Oct. 2, 2014

(30) Foreign Application Priority Data

Apr. 1, 2013 (TW) .............................. 102205989 U

(51) Int. Cl.
*B62B 3/02* (2006.01)
*A63B 47/00* (2006.01)
*B62B 3/10* (2006.01)

(52) U.S. Cl.
CPC ................. *B62B 3/025* (2013.01); *A63B 47/00* (2013.01); *B62B 3/10* (2013.01); *B62B 2202/40* (2013.01); *B62B 2205/003* (2013.01); *B62B 2205/06* (2013.01)

(58) Field of Classification Search
CPC .. B62B 2205/06; B62B 3/02; B62B 2205/00; B62B 2206/02; B62B 1/12; B62B 2202/68; B62B 2205/02; B62B 3/027; B62B 2205/30; A47B 31/04; A61G 1/013; A61G 1/0293; A61G 1/0237; A61G 1/0565; A61G 1/0567; A61G 2005/0825; A61G 2005/0841; A61G 2005/0891
USPC ................ 280/638, 35, 639, 640, 646, 47.34, 280/47.35, 651
See application file for complete search history.

(56) References Cited

U.S. PATENT DOCUMENTS

| 1,429,849 | A | * | 9/1922 | Dolge | 280/640 |
|---|---|---|---|---|---|
| 1,539,986 | A | * | 6/1925 | Beatty | 280/35 |
| 1,649,203 | A | * | 11/1927 | Wickstrum | 280/640 |
| 1,769,418 | A | * | 7/1930 | Cooper et al. | 280/645 |
| 1,771,836 | A | * | 7/1930 | Beckham et al. | 280/640 |
| 2,434,998 | A | * | 1/1948 | Goldman | 280/42 |
| 4,266,807 | A | * | 5/1981 | Griffin | 280/650 |
| 4,361,215 | A | * | 11/1982 | Sawai | 190/18 A |
| 4,739,527 | A | * | 4/1988 | Kohus et al. | 5/99.1 |
| 4,779,635 | A | * | 10/1988 | Lynch | 135/97 |
| 4,989,749 | A | * | 2/1991 | Choi | 280/47.34 |
| 5,230,196 | A | * | 7/1993 | Zeigler | 52/646 |
| 5,307,908 | A | * | 5/1994 | Shyr et al. | 190/18 A |
| 5,704,528 | A | * | 1/1998 | Faure | 224/583 |
| 5,984,406 | A | * | 11/1999 | Lee | 297/16.2 |
| 6,276,548 | B1 | * | 8/2001 | Mitchell | 220/9.4 |
| 6,349,962 | B1 | * | 2/2002 | Johanson | 280/651 |
| 6,929,230 | B2 | * | 8/2005 | Tsai | 248/436 |
| 8,162,349 | B1 | * | 4/2012 | Roselle | 280/654 |
| 8,882,135 | B1 | * | 11/2014 | Chen | 280/651 |
| 2010/0090444 | A1 | * | 4/2010 | Chen et al. | 280/651 |
| 2011/0204598 | A1 | * | 8/2011 | Stevenson | 280/639 |

* cited by examiner

*Primary Examiner* — Paul N Dickson
*Assistant Examiner* — Bridget Avery
(74) *Attorney, Agent, or Firm* — Alan D. Kamrath; Kamrath IP Lawfirm, P.A.

(57) ABSTRACT

A folding ball trolley having a minimized volume has a frame, a bag and multiple resilient elements. The frame has four stand rods, four top seats, four sliding seats, four wheels, four connecting rod assemblies and four mounting rods. The bag connects to the mounting rods, and the mounting rods pivotally connect to the stand rods. Accordingly, the mounting rods can be rotated relative to the stand rods, such that the mounting rods do not protrude upward to occupy too much space when the ball trolley is folded. Besides, the frame is braced by the resilient elements so a user does not have to stretch his hands between the rods when folding the ball trolley, thereby preventing the hands from being clamped.

22 Claims, 14 Drawing Sheets

FOLDING BALL TROLLEY HAVING MINIMIZED VOLUME

CROSS-REFERENCE TO RELATED APPLICATIONS

This application is based upon and claims priority under 35 U.S.C. 119 from Taiwan Patent Application No. 102205989 filed on Apr. 1, 2013, which is hereby specifically incorporated herein by this reference thereto.

BACKGROUND OF THE INVENTION

1. Field of the Invention

The present invention relates to a folding ball trolley and, especially, to a ball trolley that can be minimized in volume when folded.

2. Description of the Prior Arts

A ball trolley is common in sports arenas, such as a gymnasium, for containing multiple and various kinds of balls, such as volleyballs, basketballs and so on. A user can conveniently move the ball trolley with the balls in it, or the user can take out the balls continually from the ball trolley for use.

With reference to FIG. 11, a first conventional ball trolley has a folding frame 81, a bag 82 and multiple resilient elements 83. The frame 81 has four stand rods 811, four wheels 813 and multiple connecting rods 812. The wheels 813 are respectively mounted on bottom ends of the stand rods 811 for moving the first conventional ball trolley. A top end of each connecting rod 812 pivotally connects to a top end of one of the stand rods 811, while the bottom end of each connecting rod 812 pivotally connects to another stand rod 811 in an axially moveable manner. The bag 82 is mounted around the frame 81 and has a room 821 and a top opening to contain the balls. The resilient element 83 is mounted between the top end of one of the stand rods 811 and the bottom end of the connecting rod 812 connecting to the same stand rod 811, such that the resilient element 83 pulls up the bottom end of the connecting rod 812 to brace outward the two adjacent stand rods 811.

However, said conventional ball trolley has the following shortcomings. First, the frame 81 is disposed inside the bag 82, such that the frame 81 may scrape the balls or the user's hands stretching into the room 821 to take out the ball. Second, the top opening of the room 821 is so small that the user cannot take out the balls conveniently. Third, the room 821 is too deep, which is also another reason that the user cannot take out the balls conveniently.

With reference to FIG. 12, to solve the shortcomings mentioned above, a second conventional ball trolley is provided. The four connecting rods 912 are inclined and protrude out of the top ends of the stand rods 911. The bag 92 is mounted around the protruding connecting rods 912 to form a shallower room 921 with a bigger opening. Besides, the connecting rods 912 connect to an outside surface of the bag 92 to keep the ball and the hands from being scraped.

However, the second conventional ball trolley still has the flowing shortcomings. First, with reference to FIG. 13, the second conventional ball trolley has multiple bracing rods 914. Two of the bracing rods 914 are mounted between two adjacent connecting rods 912, and are pivotally connecting and engaged with each other. When the second conventional ball trolley is folding, the two bracing rods 914 are pushed upward first, such that the hands of the user may get clamped by the bracing rods 914 and the connecting rods 912. Second, with reference to FIG. 14, after the second conventional ball trolley is folded, the connecting rods 912 are substantially straight upright and protrude upward, which increases the volume of the second conventional ball trolley to occupy more space in transportation and storage. Third, with reference to FIG. 12, the top opening of the bag 92 is wider, but the room 921 is shallower, and the bag 92 is trapezoidal in cross section. As a result, the room 921 of the bag 92 is still not big enough in its capacity for containing balls.

To overcome the shortcomings, the present invention provides a folding ball trolley having minimized volume to mitigate or obviate the aforementioned problems.

SUMMARY OF THE INVENTION

The main objective of the present invention is to provide a folding ball trolley that can be minimized in volume when folded.

The folding ball trolley having minimized volume has a frame, a bag and multiple resilient elements. The frame has four stand rods, four top seats, four sliding seats, four wheels, four connecting rod assemblies and four mounting rods. The stand rods are arranged in a rectangle. The top seats are respectively mounted on top ends of the stand rods. The sliding seats are respectively mounted movably on the stand rods. The wheels are respectively mounted on bottom ends of the stand rods. Each connecting rod assembly is mounted between two adjacent stand rods. The mounting rods respectively and pivotally connect to the top seats. The bag is mounted on the frame, connects to the mounting rods and has a room and an opening. The resilient elements are mounted on the frame and brace the frame outwardly.

Because the bag connects to the mounting rods and the mounting rods pivotally connect to the stand rods, the mounting rods can be rotated relative to the stand rods, such that the mounting rods do not protrude upward to occupy too much space when the ball trolley is folded. Besides, the frame is braced by the resilient elements so a user does not have to stretch his hands between the rods when folding the ball trolley, which prevents the hands from being clamped.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
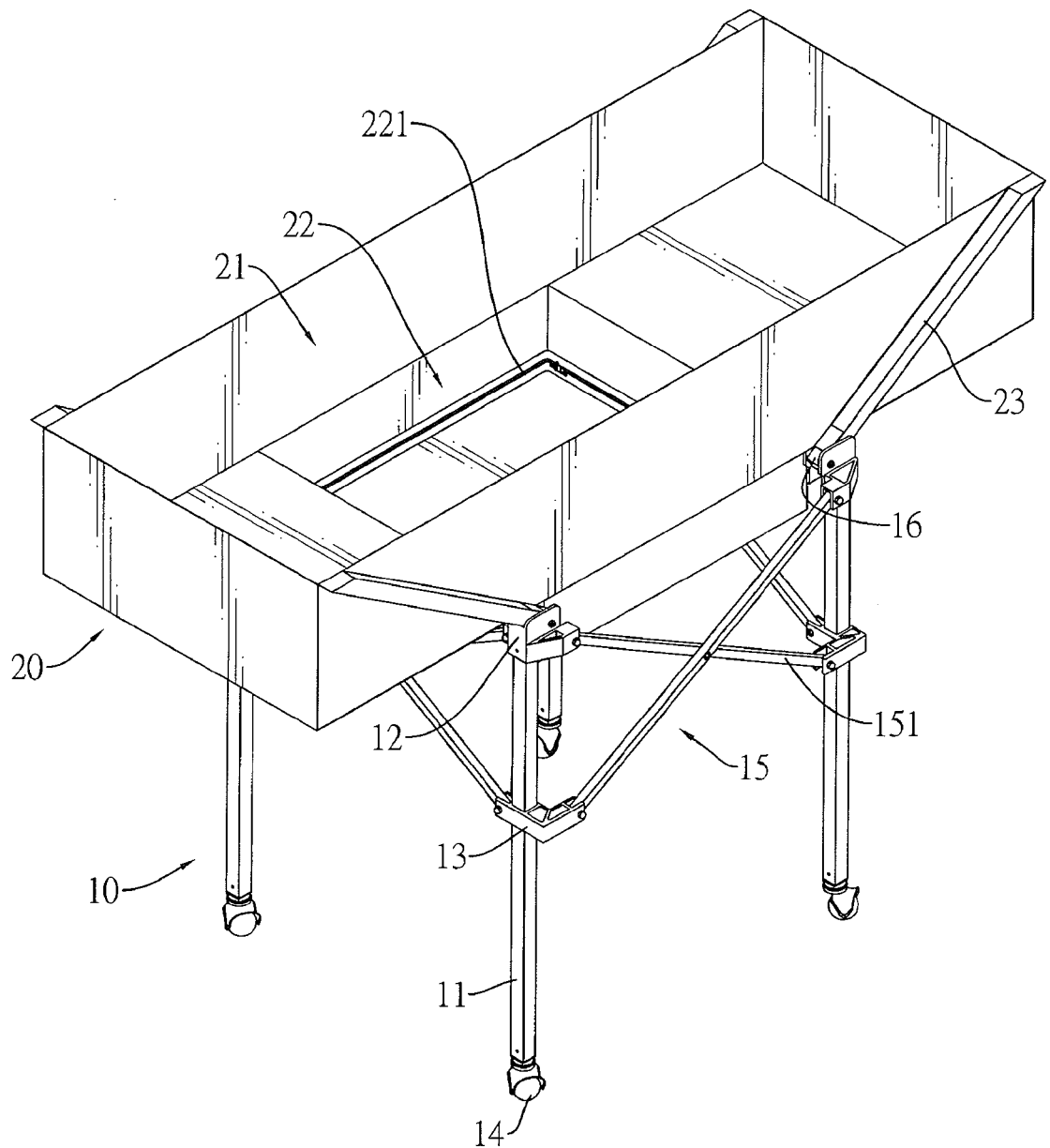
FIG. 1 is a perspective view of a folding ball trolley having minimized volume in accordance with the present invention.
Figure 2:
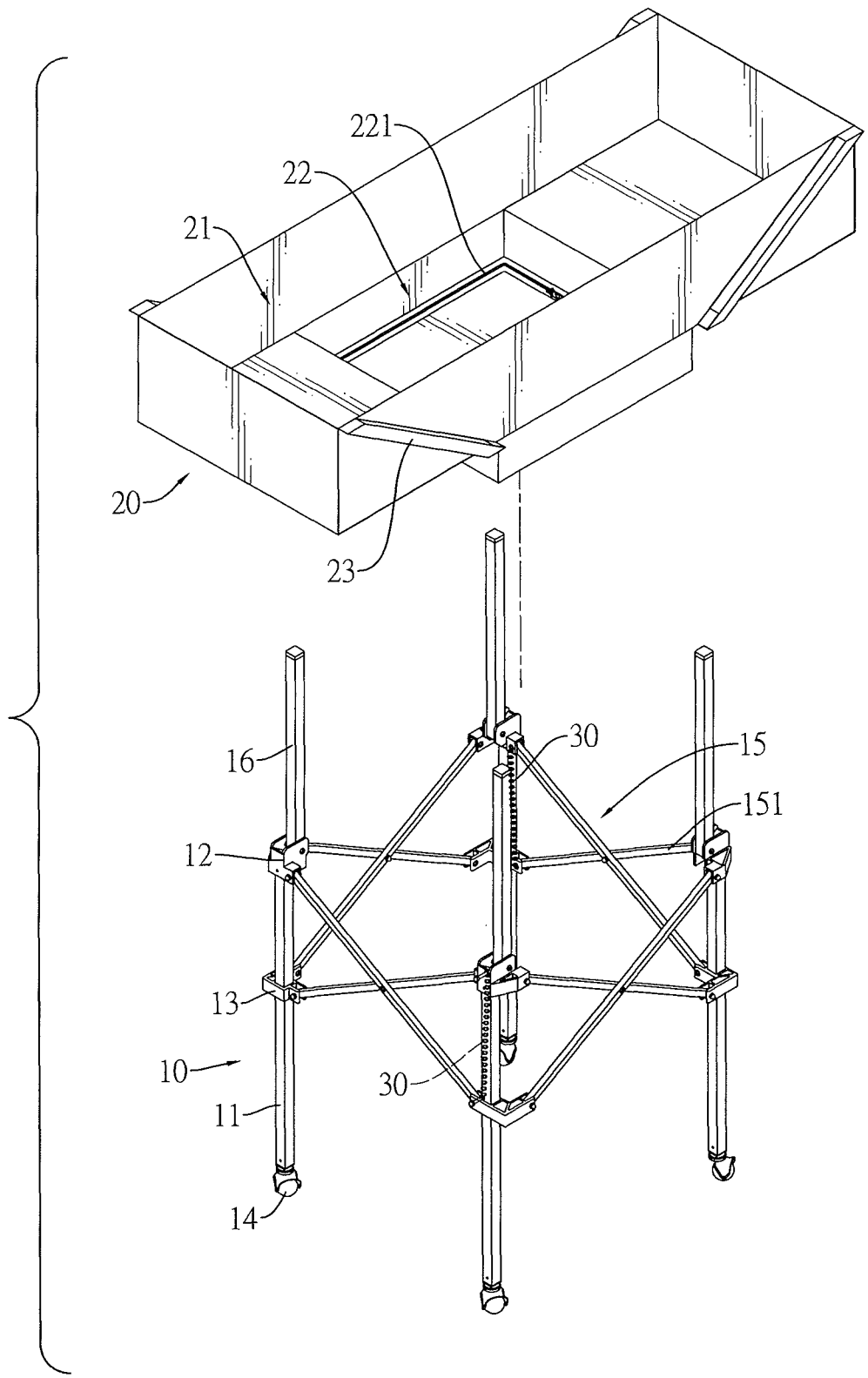
FIG. 2 is an exploded perspective view of the folding ball trolley in FIG. 1.
Figure 3:
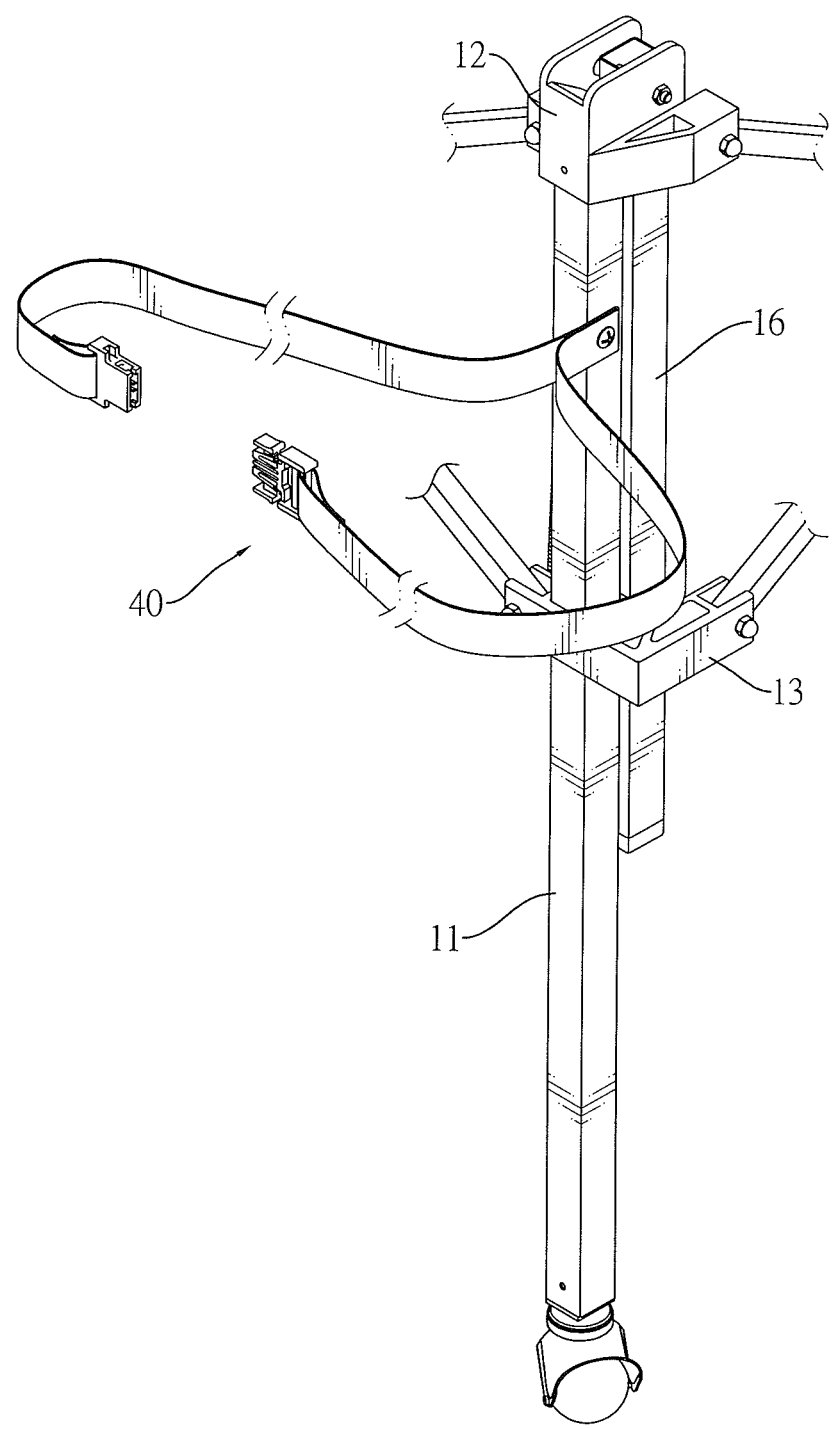
FIG. 3 is an enlarged perspective view of the folding ball trolley in FIG. 1, showing a fastening belt mounted on the ball trolley.

With reference to FIGS. 1 to 3, a folding ball trolley having minimized volume in accordance with the present invention comprises a frame 10, a bag 20 and multiple resilient elements 30. In a preferred embodiment, the folding ball trolley further has a fastening belt 40.

With reference to FIGS. 1 and 2, the frame 10 has four stand rods 11, four top seats 12, four sliding seats 13, four wheels 14, four connecting rod assemblies 15 and four mounting rods 16.

The stand rods 11 are arranged in a rectangle.

Figure 4:
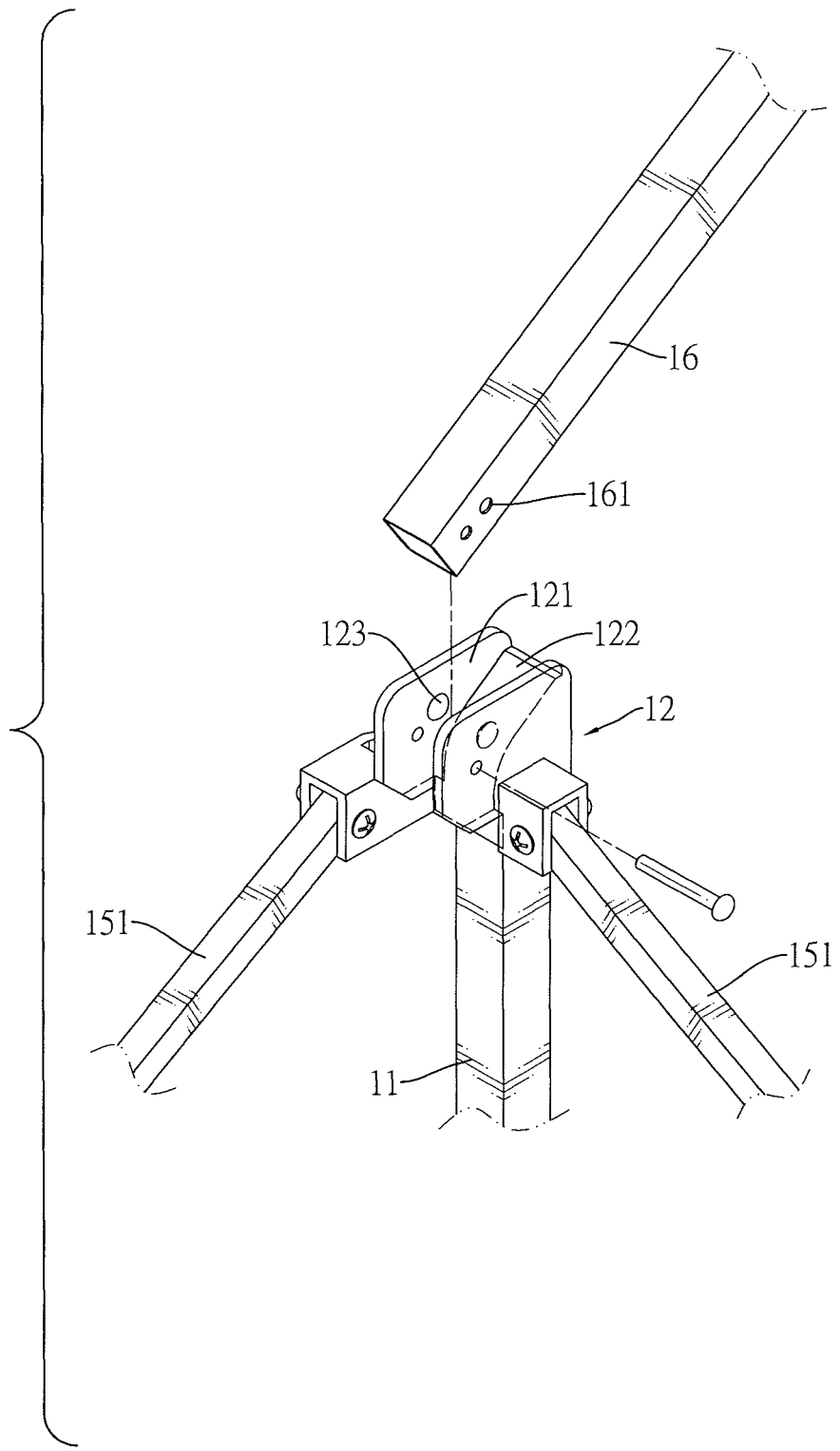
FIG. 4 is an enlarged perspective view of the folding ball trolley in FIG. 1, showing a top seat.
Figure 5:
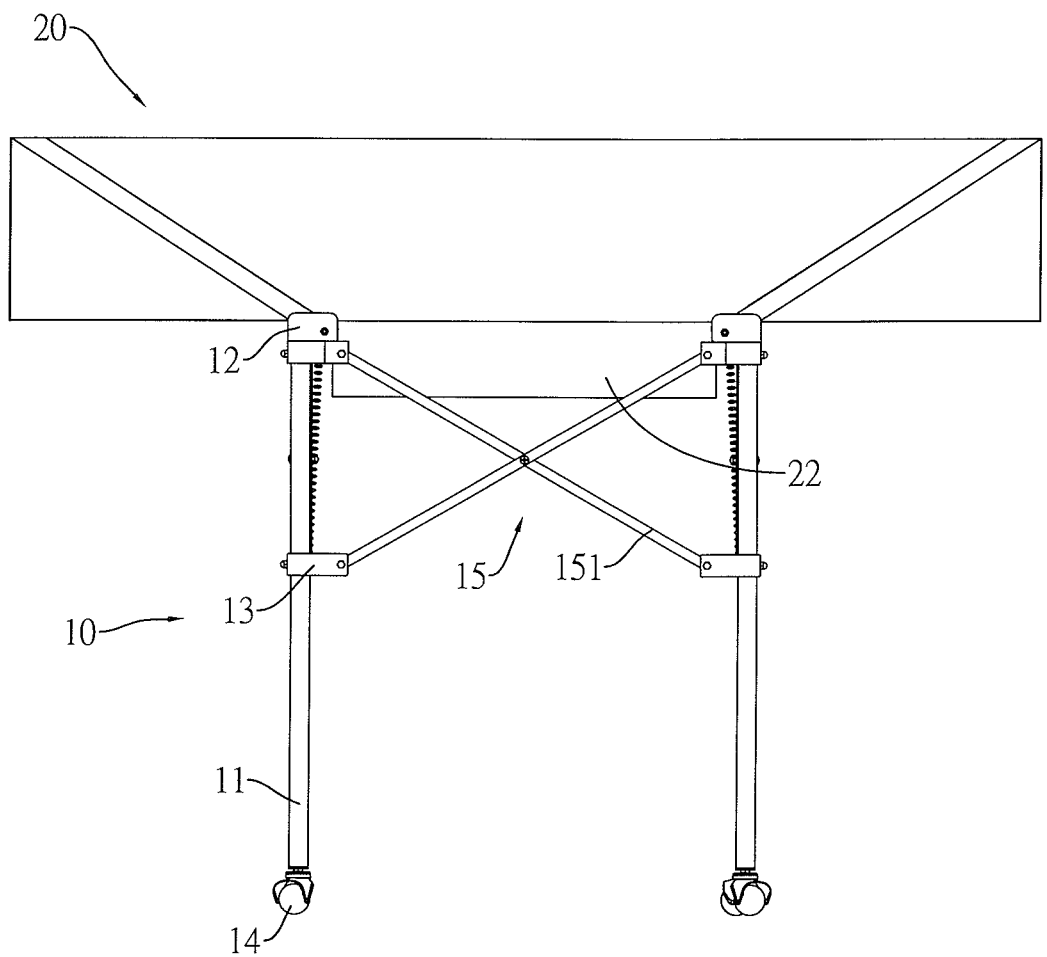
FIG. 5 is an operational front view of the folding ball trolley in FIG. 1, showing a bottom room folded.
Figure 6:
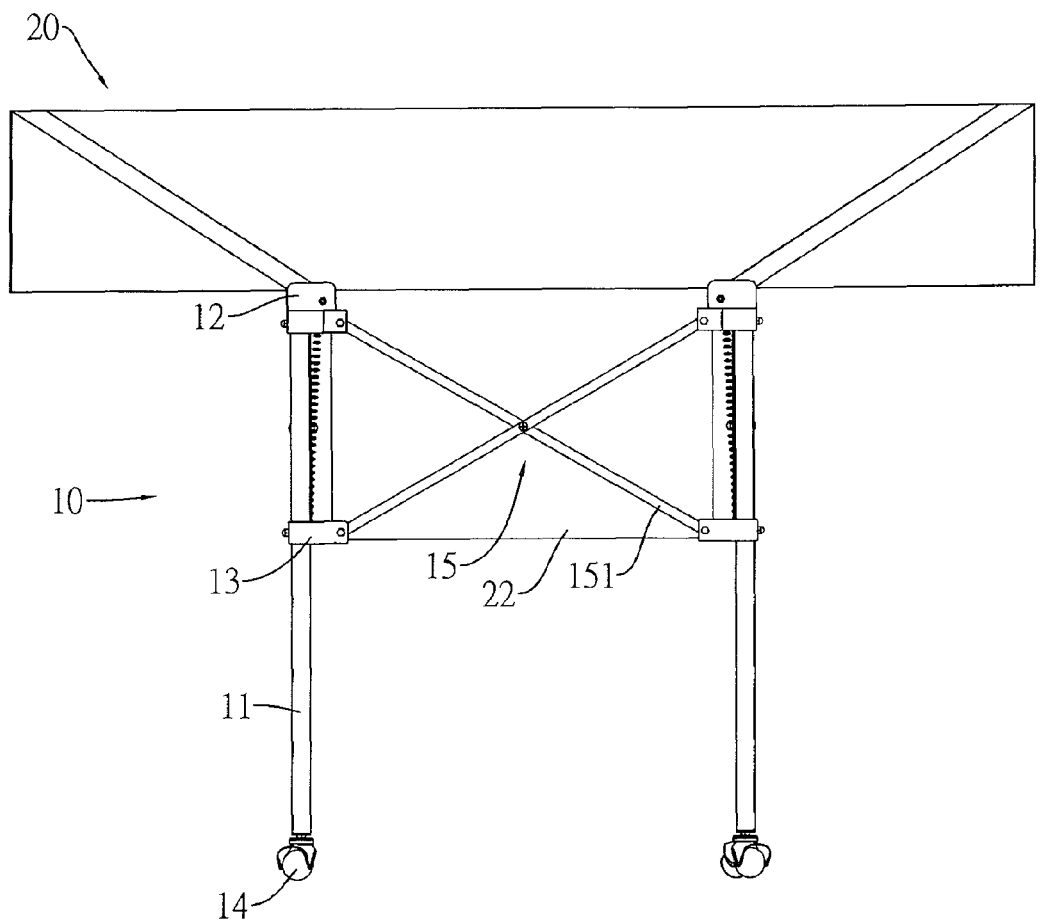
FIG. 6 is an operational front view of the folding ball trolley in FIG. 1, showing the bottom room expanded.
Figure 7:
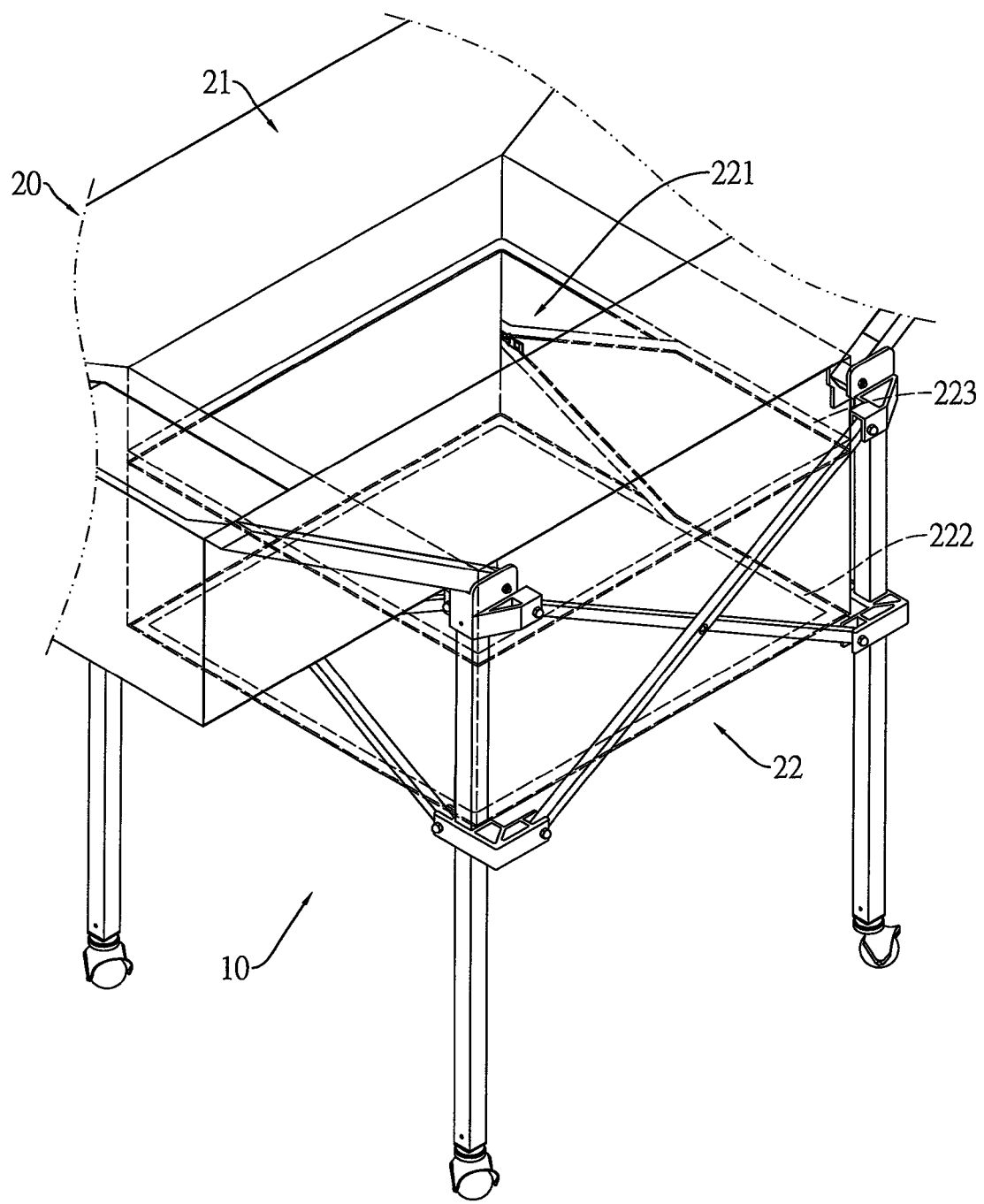
FIG. 7 is an enlarged operational perspective view of the folding ball trolley in FIG. 1, showing the bottom room expanded.

With reference to FIGS. 1, 2 and 4, the top seats 12 are respectively mounted on top ends of the stand rods 11. In a preferred embodiment, two of the top seats 12 are mounted facing to each other, and the other two top seats 12 are also mounted facing to each other. Each top seat 12 has two pivoting walls 121, two positioning points 123 and an abutting surface 122. The pivoting walls 121 are mounted with an interval between each other. The positioning points 123 are respectively formed on inside surfaces of the pivoting walls 121. The abutting surface 122 is disposed between the pivoting walls 121 and is inclined downward from outside to inside. The top seats 12 are preferably made of, but not limited to, plastic.

With reference to FIGS. 1 and 2, the sliding seats 13 are respectively mounted movably on the stand rods 11.

The wheels 14 are respectively mounted on bottom ends of the stand rods 11.

Each connecting rod assembly 15 is mounted between two adjacent stand rods 11. In a preferred embodiment, each connecting rod assembly 15 has two connecting rods 151. The connecting rods 151 pivotally connect to each other. Two ends of each connecting rod 151 respectively and pivotally connect to the top seat 11 and sliding seat 13 on two adjacent stand rods 11, such that each top seat 12 pivotally connects to two connecting rods 151 in a perpendicular direction, and each sliding seat 13 also pivotally connects to two connecting rods 151 in a perpendicular direction.

With reference to FIGS. 1, 2 and 4, the mounting rods 16 respectively and pivotally connect to the top seats 12. In a preferred embodiment, each mounting rod 16 is mounted between the pivoting walls 121 of the corresponding top seat 12 and selectively abuts the abutting surface 122 of the top seat 12. Each mounting rod 16 has two positioning recesses 161. The positioning recesses 161 are respectively formed in opposite outside surfaces of the mounting rod 16 and respectively and selectively engage the positioning points 123 of the pivoting walls 121 of the top seat 12.

With reference to FIGS. 1 and 2, the bag 20 is mounted on the frame 10, connects to the mounting rods 16 and has a room 21 and an opening. In a preferred embodiment, an outline of the bag 20 is rectangular, and the room 21 is cuboid. The bag 20 further has a bottom room 22 formed in a bottom of the room 21. With reference to FIGS. 2 and 5 to 7, the bottom room 22 can be expanded downward to enlarge the capacity. The bag 20 has a zipper 221 mounted around an inside surface of the bottom room 22. The zipper 221 has a connecting point, a lower zipper strip 222 and an upper zipper strip 223. The lower zipper strip 222 and the upper zipper strip 223 are connected to each other at the connecting point. The connecting point is defined on a vertical side of the bottom room 22. After the bottom room 22 is expanded, the connecting point is substantially at a one-third height from bottom to top of the bottom room 22. The lower zipper strip 222 is mounted around the inside surface of the bottom room 22, extends from the connecting point, extends downward obliquely to a bottom of the bottom room 22, and then surrounds the inside surface of the bottom room 22. The upper zipper strip 223 is mounted around the inside surface of the bottom room 22, extends from the connecting point, extends upward obliquely to a two-third height from bottom to top of the bottom room 22, and then surrounds the inside surface of the bottom room 22. With reference to FIGS. 1 and 2, the bag 20 further has a first outside surface, a second outside surface and four mounting segments 23. The first outside surface and the second outside surface are opposite to each other. Two of the mounting segments 23 are mounted facing to each other on the first outside surface. The other two mounting segments 23 are also mounted facing to each other on the second outside surface. Each mounting segment 23 is elongated, is inclined downward from an outside end to an inside end and has an inner cavity and an opening. The mounting segments 23 are respectively mounted around the mounting rods 16 of the frame 10.

Figure 8:
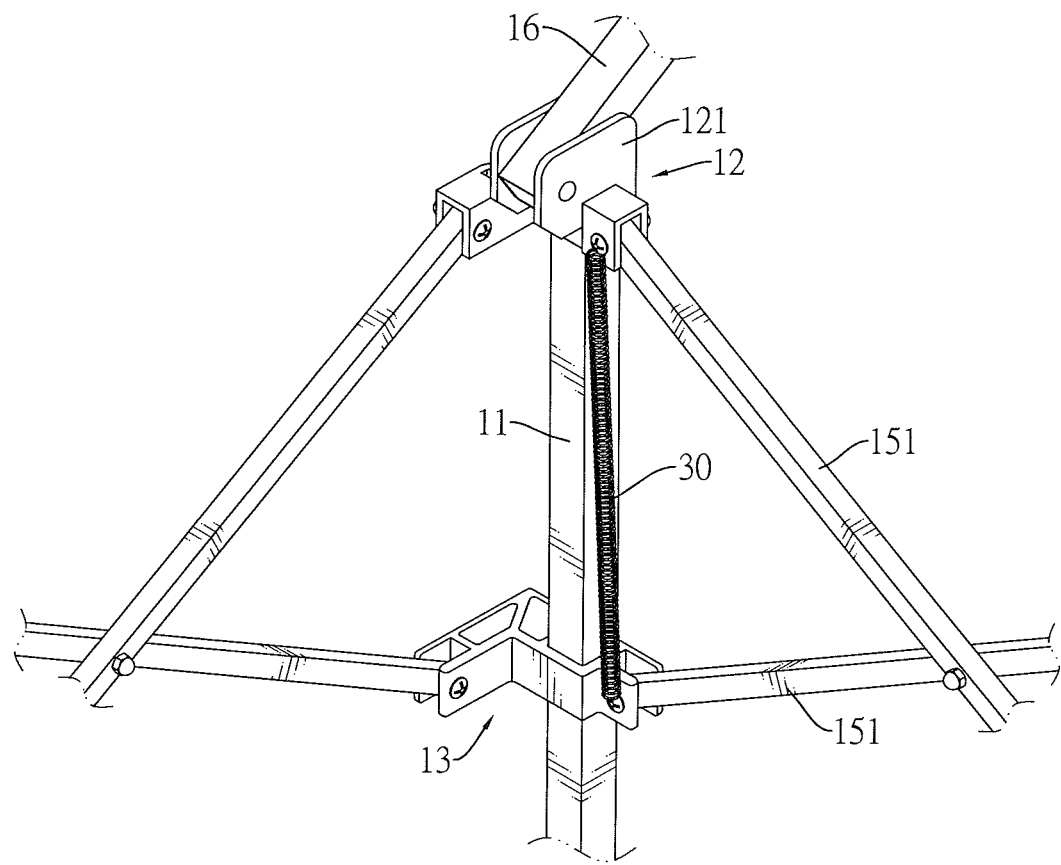
FIG. 8 is an enlarged perspective view of the folding ball trolley in FIG. 1, showing a resilient element mounted on the ball trolley.

With reference to FIGS. 1, 2 and 8, the resilient elements 30 are mounted on the frame 10. and brace the frame 10 outwardly. In a preferred embodiment, the folding ball trolley having a minimized volume has two resilient elements 30 respectively mounted on two diagonally opposite stand rods 11. Two ends of each resilient element 30 respectively connect to the top seat 12 and the sliding seat 13 on the same stand rod 11. The resilient elements 30 are springs.

With reference to FIGS. 1 to 3, the fastening belt 40 is mounted on the frame 10. The fastening belt 40 selectively surrounds and fastens the frame 10. In a preferred embodiment, the fastening belt 40 is mounted securely on one of the stand rods 11, and two ends of the fastening belt 40 selectively engage with each other.

With reference to FIGS. 1 and 4, when the folding ball trolley as described is in use, the stand rods 11 are expanded. Each mounting rod 16 abuts the abutting surface 122 of the corresponding top seat 12. The positioning recesses 161 of the mounting rod 16 respectively engage the positioning points 123 of the corresponding top seat 12. The mounting segments 23 of the bag 20 are respectively mounted around the expanded mounting rods 16, so that the bag 20 is braced up.

The user can put various kinds of balls into the room 21 and the bottom room 22 of the bag 20. Because the room 21 is cuboid and the bag 20 has a bottom room 22 formed in the bottom of the room 21, the capacity of the bag 20 is enhanced. With reference to FIGS. 2 and 5 to 7, the bottom room 22 can be expanded and folded to adjust the capacity of the bag 20. When the bottom room is folded, the lower zipper strip 222 and the upper zipper strip 223 are zipped up, and parts of the walls of the bottom room 22 are folded between the lower zipper strip 222 and the upper zipper strip 223. When the bottom room 22 is to be expanded, the zipper 221 is fully zipped open, and then the bottom of the bottom room 22 with the lower zipper strip 222 can be pulled down, thereby extending down the folded walls of the bottom room 22. The capacity of the bottom room 22 when expanded is enlarged to be three times bigger than the capacity of the bottom room 22 when folded. To expand or to fold the bottom room 22, the user just has to pull the zipper 221, which is convenient.

Figure 9:
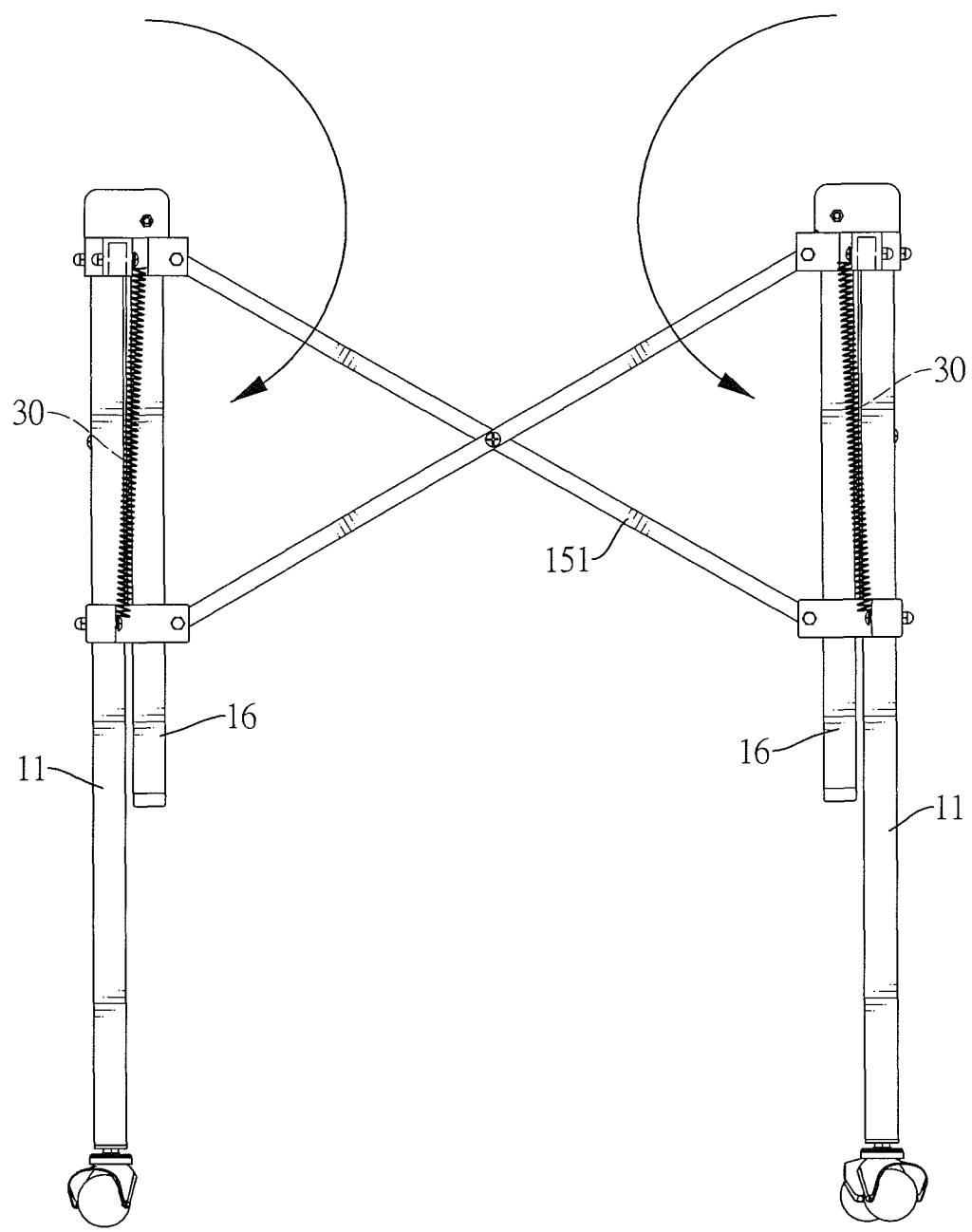
FIG. 9 is an operational view of the folding ball trolley in FIG. 1, showing the mounting rods folded.
Figure 10:
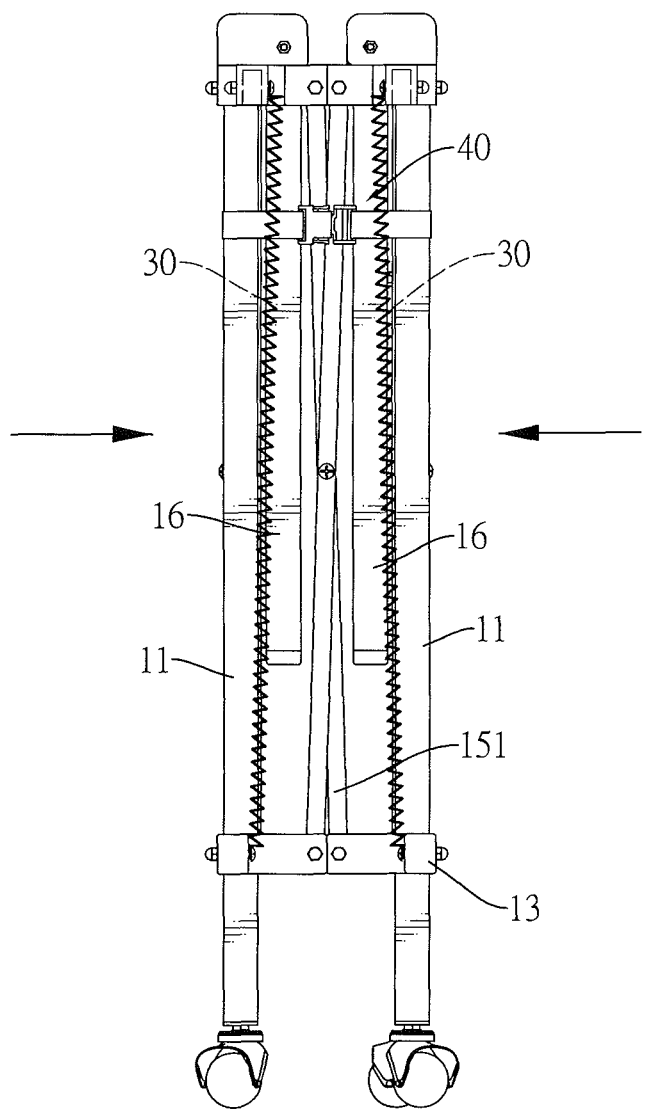
FIG. 10 is an operational view of the folding ball trolley in FIG. 1, showing the stand rods folded.
Figure 11:
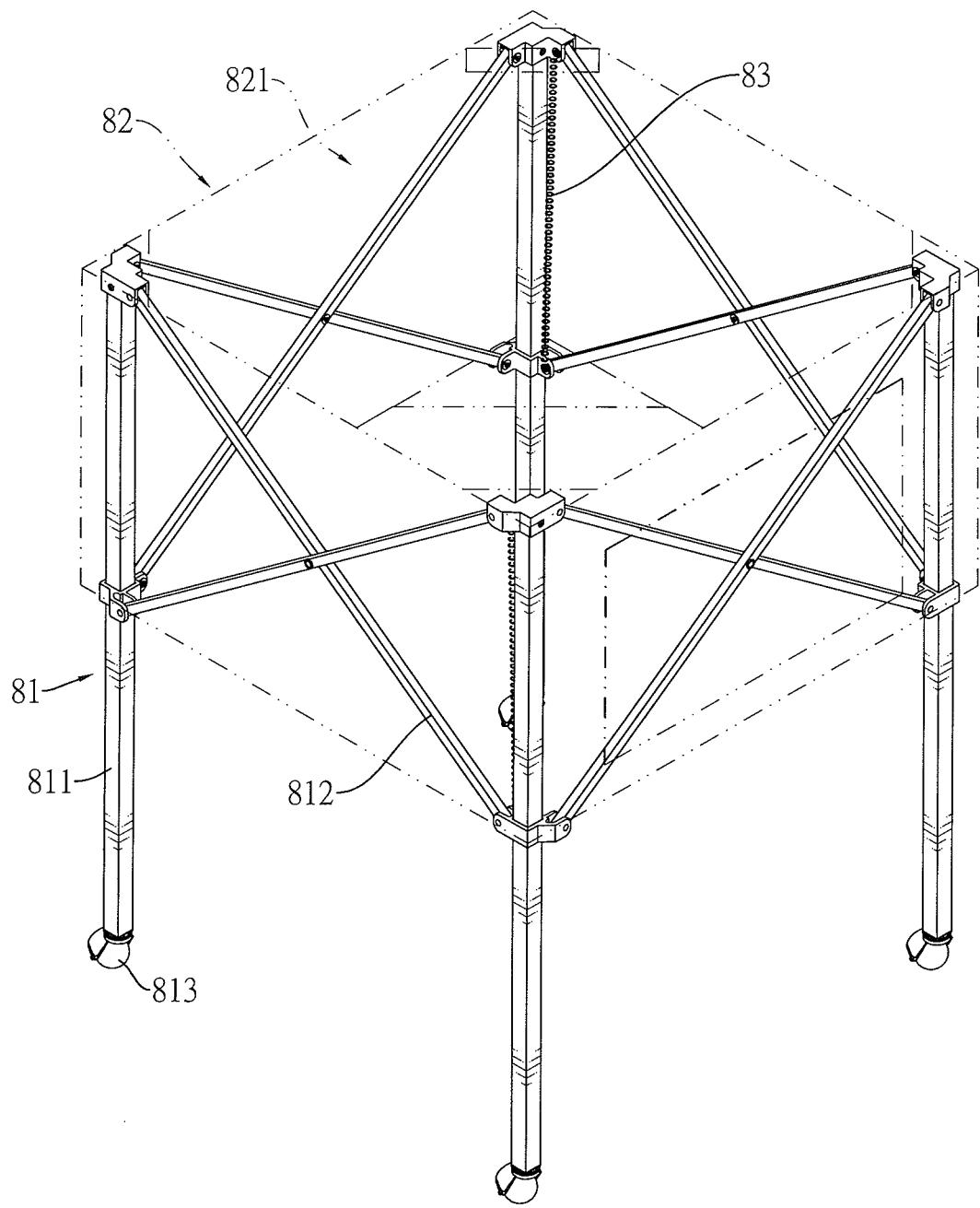
FIG. 11 is a perspective view of a first conventional ball trolley in accordance with the prior art.
Figure 12:
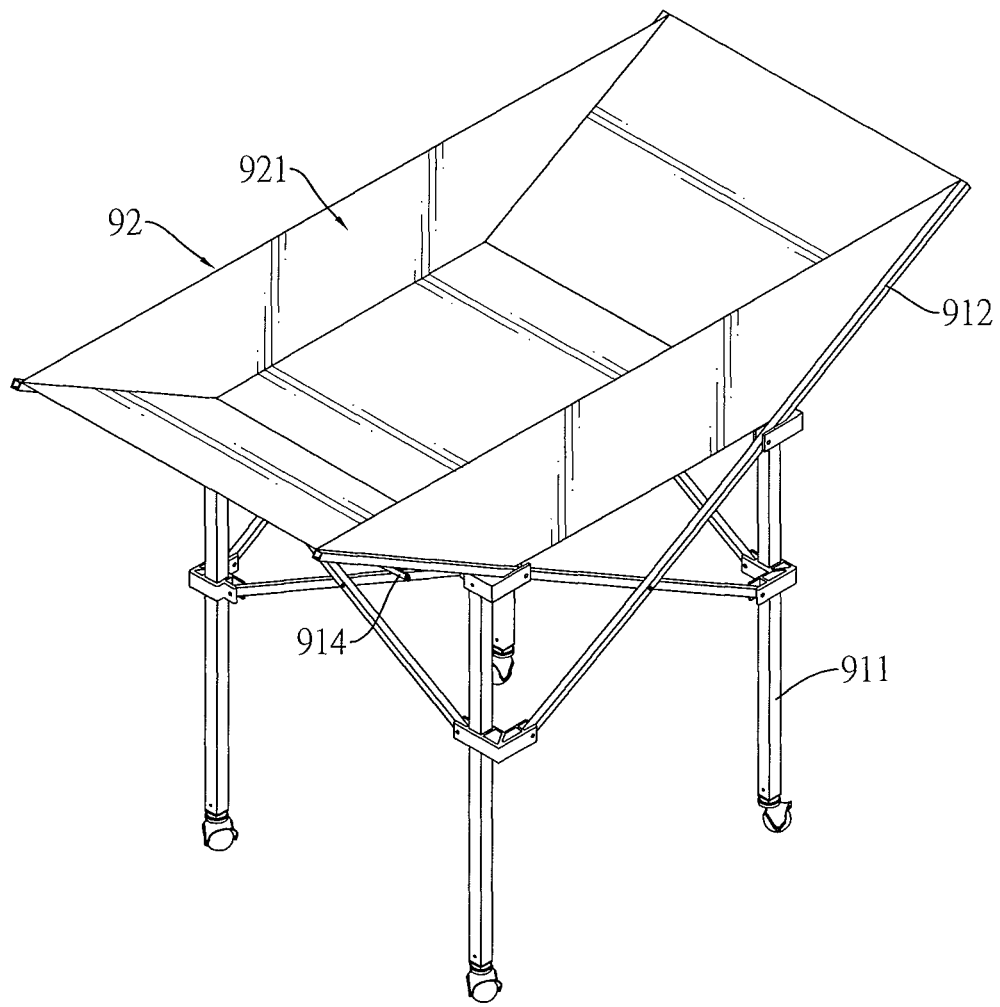
FIG. 12 is a perspective view of a second conventional ball trolley in accordance with the prior art.
Figure 13:
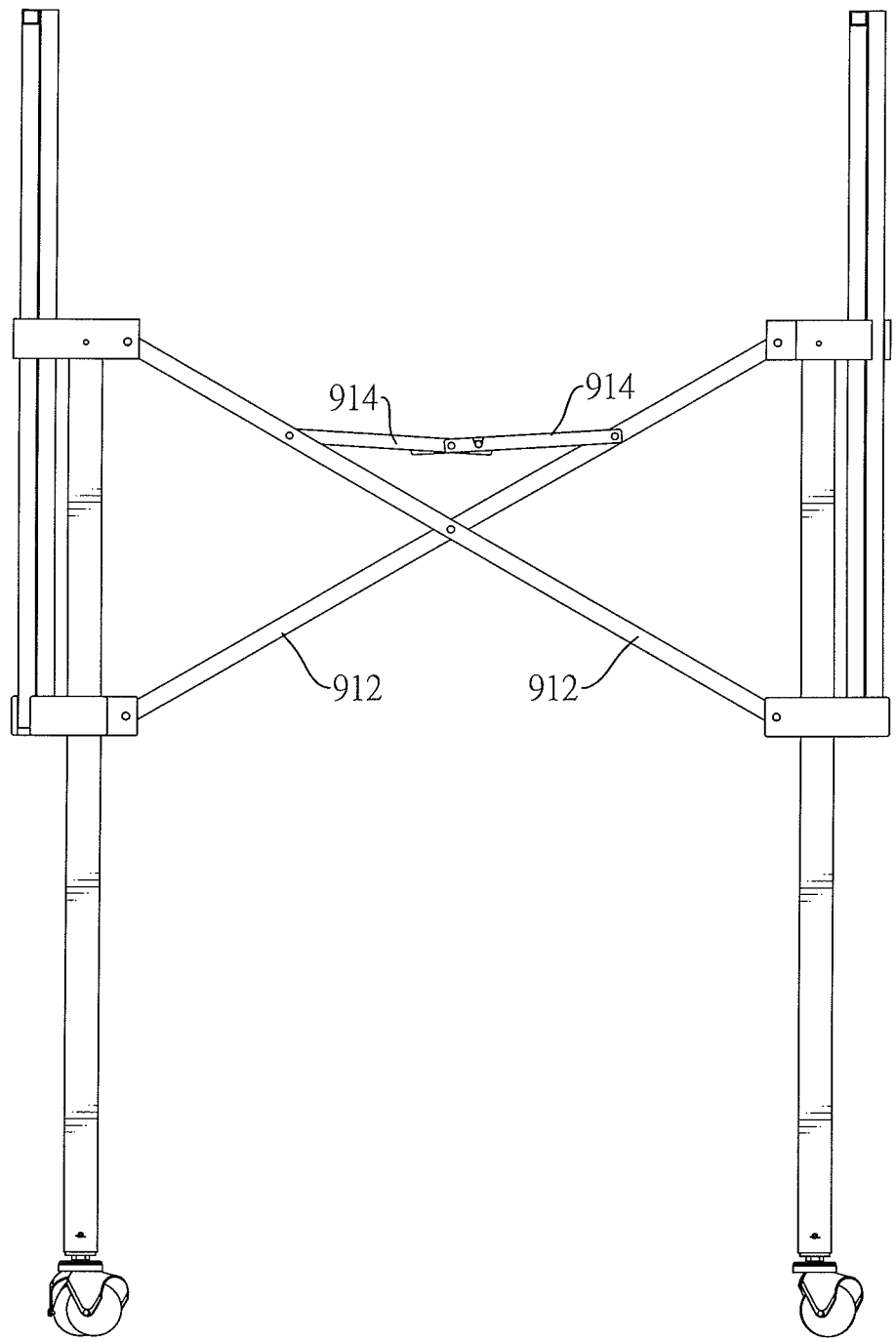
FIG. 13 is a side view of the conventional ball trolley in FIG. 9, showing the bracing rods.
Figure 14:
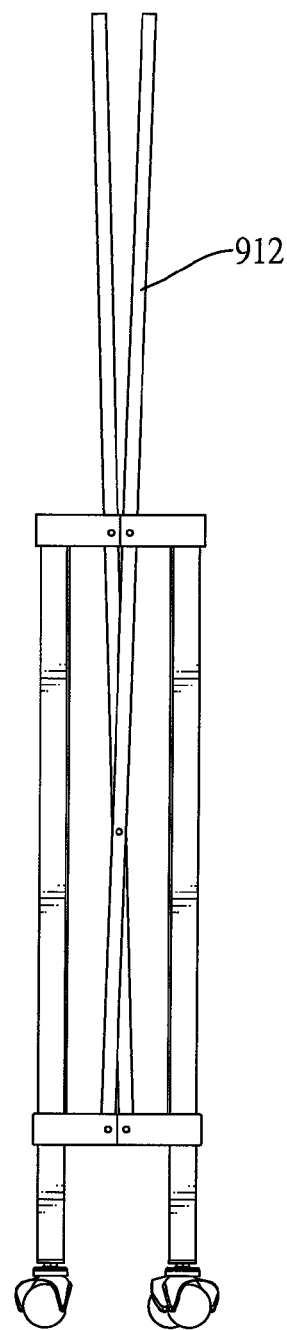
FIG. 14 is a front operational view of the conventional ball trolley in FIG. 9, showing the ball trolley folded.

With reference to FIG. 4, when the folding ball trolley having a minimized volume is folding, each mounting rod 16 is slightly rotated relative to the top seat 12, so that the positioning recesses 161 of the mounting rod 16 depart from the positioning points 123 of the top seat 12. Then, the mounting rod 16 can be rotated relative to the top seat 12 freely. With reference to FIG. 2, the bag 20 is taken up, and along with the movement of the bag 20, the mounting rods 16 are gradually turned upward to be vertical. With reference to FIG. 9, afterward, each mounting rod 16 is rotated relative to the top seat 12 until the mounting rod 16 is parallel to the stand rods 11 and is adjacent to an inside surface of the stand rod 11. With reference to FIG. 10, then, the stand rods 11 are pushed inward. When the two adjacent stand rods 11 get closer, the bottom end of each connecting rod 151 resists the resistance force of the resilient element 30 and pushes down the sliding seats 13. The sliding seat 13 moves downward with a bottom end of another connecting rod 151. Therefore, pushing any two opposite stand rods 11 inward moves all the stand rods 11 inward. After the stand rods 11 are moved inward, two ends of the fastening belt 40 surround the stand rods 11 and connect each other securely, which prevents the stand rods 11 from being expanded by the resilient force of the resilient element 30.

As mentioned above, to fold the stand rods, a user just has to push outside surfaces of any two opposite stand rods 11 inward. The user does not have to stretch his hands between the stand rods 11, which prevents the hands from being clamped. In addition, the mounting rods 16 are adjacent to the inside surfaces of the stand rods 11 and do not protrude upward, such that the volume of the ball trolley can be reduced when the ball trolley is folded, which is convenient for transportation and storage.

To sum up, the folding ball trolley having a minimized volume as described can enhance the capacity for use, can prevent the user from being clamped during folding, and can reduce the volume when folded.

When the ball trolley is going to be expanded from a folded condition, the user just unfastens the fastening belt. Then, the bracing resilient elements 30 recover to the original length and pull up the sliding seat 13, thereby expanding the stand rods 11. Accordingly, the bag 20 is mounted on the frame 10.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A folding ball trolley having minimized volume, comprising:
   a frame having:
      four stand rods arranged in a rectangle;
      four top seats respectively mounted on top ends of the four stand rods;
      four sliding seats respectively mounted movably on the four stand rods;
      four wheels respectively mounted on bottom ends of the four stand rods;
      four connecting rod assemblies, each connecting rod assembly mounted between two adjacent stand rods; and
      four mounting rods respectively and pivotally connecting to the four top seats, with each mounting rod pivotal between a folded position intermediate a corresponding top seat and a corresponding wheel and an expanded position extending at an obtuse angle relative to the corresponding stand rod and outward of the frame;
   a bag mounted on the frame, connecting to the four mounting rods and having a room and an opening; and
   multiple resilient elements mounted on the frame and bracing the frame.

2. The folding ball trolley as claimed in claim 1, wherein two ends of each resilient element respectively connect to the top seat and the sliding seat on a same stand rod.

3. The folding ball trolley as claimed in claim 1, wherein the multiple resilient elements are springs.

4. The folding ball trolley as claimed in claim 1, wherein:
   the bag has:
      a first outside surface;
      a second outside surface opposite to the first outside surface; and
      four mounting segments;
   two of the four mounting segments are mounted facing to each other on the first outside surface;
   another two of the four mounting segments mounted facing to each other on the second outside surface;
   each mounting segment is elongated, inclined downward from an outside end to an inside end and has an inner cavity and an opening;
   the four mounting rods are respectively mounted in the four mounting segments of the bag; and
   each mounting segment is inclined downward relative to the corresponding stand rod at the obtuse angle.

5. The folding ball trolley as claimed in claim 1, wherein:
   two of the four top seats are mounted facing to each other and another two of the four top seats are mounted facing to each other;
   each top seat has an abutting surface inclined downward from outside to inside at the obtuse angle to the corresponding stand rod; and
   each mounting rod selectively abuts the abutting surface of a corresponding top seat.

6. The folding ball trolley as claimed in claim 1, wherein:
   each top seat has:
      two pivoting walls formed with an interval between each other; and
      two positioning points respectively formed on opposite inside surfaces of the two pivoting walls; and
   each mounting rod is mounted between the two pivoting walls of a corresponding top seat and has two positioning recesses respectively formed in opposite outside surfaces of the mounting rod and respectively and selectively engaging the two positioning points of the corresponding top seat in the expanded position.

7. The folding ball trolley as claimed in claim 1, wherein an outline of the bag is rectangular.

8. The folding ball trolley as claimed in claim 1, wherein the bag further has a bottom room formed in a bottom of the room of the bag.

9. The folding ball trolley as claimed in claim 1 further comprising a fastening belt mounted on the frame and selectively surrounding and fastening the frame.

10. The folding ball trolley as claimed in claim 2, wherein the multiple resilient elements are springs.

11. The folding ball trolley as claimed in claim 10, wherein:
- the bag has:
  - a first outside surface;
  - a second outside surface opposite to the first outside surface; and
  - four mounting segments;
- two of the four mounting segments are mounted facing to each other on the first outside surface;
- another two of the four mounting segments mounted facing to each other on the second outside surface;
- each mounting segment is elongated, inclined downward from an outside end to an inside end and has an inner cavity and an opening;
- the four mounting rods are respectively mounted in the four mounting segments of the bag; and
- each mounting segment is inclined downward relative to the corresponding stand rod at the obtuse angle.

12. The folding ball trolley as claimed in claim 11, wherein:
- two of the four top seats are mounted facing to each other and another two of the four top seats are mounted facing to each other;
- each top seat has an abutting surface inclined downward from outside to inside at the obtuse angle to the corresponding stand rod; and
- each mounting rod selectively abuts the abutting surface of a corresponding top seat.

13. The folding ball trolley as claimed in claim 12, wherein:
- each top seat has:
  - two pivoting walls formed with an interval between each other; and
  - two positioning points respectively formed on opposite inside surfaces of the two pivoting walls; and
- each mounting rod is mounted between the two pivoting walls of a corresponding top seat and has two positioning recesses respectively formed in opposite outside surfaces of the mounting rod and respectively and selectively engaging the two positioning points of the corresponding top seat in the expanded position.

14. The folding ball trolley as claimed in claim 13, wherein each connecting rod assembly has two connecting rods pivotally connecting each other, and wherein two ends of each connecting rod respectively and pivotally connecting to the top seat and the sliding seat on the two adjacent stand rods.

15. The folding ball trolley as claimed in claim 14, wherein an outline of the bag is rectangular.

16. The folding ball trolley as claimed in claim 7, wherein the room of the bag is cuboid.

17. The folding ball trolley as claimed in claim 15, wherein the room of the bag is cuboid.

18. The folding ball trolley as claimed in claim 17, wherein the bag further has a bottom room formed in a bottom of the room of the bag.

19. The folding ball trolley as claimed in claim 8, wherein the bag has a zipper mounted around an inside surface of the bottom room of the bag, with the zipper having:
- a connecting point defined on a vertical side of the bottom room;
- a lower zipper strip mounted around the inside surface of the bottom room, extending from the connecting point, extending downward obliquely to a bottom of the bottom room, and then surrounding the inside surface of the bottom room; and
- an upper zipper strip mounted around the inside surface of the bottom room, extending from the connecting point, extending upward obliquely, and then surrounding the inside surface of the bottom room.

20. The folding ball trolley as claimed in claim 18, wherein the bag has a zipper mounted around an inside surface of the bottom room of the bag, with the zipper having:
- a connecting point defined on a vertical side of the bottom room;
- a lower zipper strip mounted around the inside surface of the bottom room, extending from the connecting point, extending downward obliquely to a bottom of the bottom room, and then surrounding the inside surface of the bottom room; and
- an upper zipper strip mounted around the inside surface of the bottom room, extending from the connecting point, extending upward obliquely, and then surrounding the inside surface of the bottom room.

21. The folding ball trolley as claimed in claim 20 further comprising a fastening belt mounted on the frame and selectively surrounding and fastening the frame.

22. A folding ball trolley having minimized volume, comprising:
- a frame having:
  - four stand rods arranged in a rectangle;
  - four top seats respectively mounted on top ends of the four stand rods;
  - four sliding seats respectively mounted movably on the four stand rods;
  - four wheels respectively mounted on bottom ends of the four stand rods;
  - four connecting rod assemblies, each connecting rod assembly mounted between two adjacent stand rods; and
  - four mounting rods respectively and pivotally connecting to the four top seats;
- a bag mounted on the frame, connecting to the four mounting rods and having a room and an opening; and
- multiple resilient elements mounted on the frame and bracing the frame, wherein each connecting rod assembly has two connecting rods pivotally connecting each other, and wherein two ends of each connecting rod respectively and pivotally connecting to the top seat and the sliding seat on the two adjacent stand rods.

* * * * *